United States Patent
Mine et al.

(10) Patent No.: US 9,716,269 B2
(45) Date of Patent: Jul. 25, 2017

(54) ELECTRODE MATERIAL AND METHOD FOR PRODUCING SAME

(71) Applicant: SUMITOMO OSAKA CEMENT CO., LTD., Tokyo (JP)

(72) Inventors: Hiroyuki Mine, Tokyo (JP); Takao Kitagawa, Tokyo (JP)

(73) Assignee: SUMITOMO OSAKA CEMENT CO., LTD. (JP)

( * ) Notice: Subject to any disclaimer, the term of this patent is extended or adjusted under 35 U.S.C. 154(b) by 123 days.

(21) Appl. No.: 14/652,305

(22) PCT Filed: Aug. 7, 2014

(86) PCT No.: PCT/JP2014/070910
§ 371 (c)(1),
(2) Date: Jun. 15, 2015

(87) PCT Pub. No.: WO2015/079744
PCT Pub. Date: Jun. 4, 2015

(65) Prior Publication Data
US 2016/0172664 A1    Jun. 16, 2016

(30) Foreign Application Priority Data

Nov. 28, 2013  (JP) ................................ 2013-246108

(51) Int. Cl.
| | | |
|---|---|---|
| H01M 4/36 | (2006.01) | |
| H01M 4/58 | (2010.01) | |
| H01M 4/62 | (2006.01) | |
| H01M 4/505 | (2010.01) | |
| H01M 4/525 | (2010.01) | |
| H01M 10/0525 | (2010.01) | |

(52) U.S. Cl.
CPC ......... *H01M 4/366* (2013.01); *H01M 4/5825* (2013.01); *H01M 4/625* (2013.01); *H01M 4/505* (2013.01); *H01M 4/525* (2013.01); *H01M 10/0525* (2013.01)

(58) Field of Classification Search
CPC .... H01M 4/366; H01M 4/625; H01M 4/5825; H01M 10/0525; H01M 4/505; H01M 4/525; Y02P 70/54
See application file for complete search history.

(56) References Cited

U.S. PATENT DOCUMENTS

| | | |
|---|---|---|
| 2003/0049529 A1 | 3/2003 | Cho et al. |
| 2012/0196185 A1 | 8/2012 | Kono et al. |
| 2013/0216902 A1* | 8/2013 | Choy ................. B60L 11/1879 429/211 |
| 2013/0260245 A1* | 10/2013 | Kitagawa .............. H01M 4/625 429/220 |

FOREIGN PATENT DOCUMENTS

| | | | |
|---|---|---|---|
| EP | 2562857 A2 | 2/2013 | |
| JP | A-2000-264614 | 9/2000 | |
| JP | A-2001-015111 | 1/2001 | |
| JP | A-2002-324551 | 11/2002 | |
| JP | A-2003-142097 | 5/2003 | |
| JP | A-2005-123107 | 5/2005 | |
| JP | A-2008-159446 | 7/2008 | |
| JP | A-2009-129587 | 6/2009 | |
| JP | A-2011-034776 | 2/2011 | |
| JP | A-2012-033478 | 2/2012 | |
| JP | WO 2012081383 A1 * | 6/2012 | ............ H01M 4/625 |
| JP | A-2012-133888 | 7/2012 | |
| JP | A-2012-169217 | 9/2012 | |
| JP | A-2013-069565 | 4/2013 | |
| JP | A-2013-525975 | 6/2013 | |
| JP | A-2013-182689 | 9/2013 | |
| JP | A-2013-538933 | 10/2013 | |
| WO | WO 2011/013652 A1 | 2/2011 | |
| WO | WO 2013/146168 A1 | 10/2013 | |
| WO | WO 2014/010730 A1 | 1/2014 | |
| WO | WO 2014/080629 A1 | 5/2014 | |

OTHER PUBLICATIONS

Office Action for Japanese Patent Application No. 2013-246108 (mailed Jul. 21, 2015).
International Search Report for International Patent Application No. PCT/JP2014/070910 (mailed Sep. 22, 2014).
Office Action for Japanese Patent Application No. 2013-246108 (mailed Oct. 28, 2014).
Office Action for Japanese Patent Application No. 2013-246108 (mailed Mar. 17, 2015).

* cited by examiner

*Primary Examiner* — Stewart Fraser
(74) *Attorney, Agent, or Firm* — Merchant & Gould P.C.

(57) ABSTRACT

An electrode material is provided in which a coating of a carbonaceous material is formed efficiently, uniformly and strongly on the surfaces of electrode active material particles, and therefore electron conductivity and the charge and discharge capacity of batteries are improved. The electrode material includes composite particles, which includes a carbonaceous substance and an electrode active material, wherein a carbonaceous material is provided on surfaces of electrode active material particles, and a standard rate constant of a redox reaction of ferrocene occurring on the surfaces of the composite particles is $1 \times 10^{-5}$ cm/s or more.

11 Claims, No Drawings

US 9,716,269 B2

ELECTRODE MATERIAL AND METHOD FOR PRODUCING SAME

TECHNICAL FIELD

The present invention relates to an electrode material and a method for producing the same. This application is a National Stage Application under 35 U.S.C. §371 of International Application of PCT/JP2014/070910 filed Aug. 7, 2014, which claims the benefit of priority to Japanese Patent Application No. 2013-246108 filed on Nov. 28, 2013, the disclosures of all of which are hereby incorporated by reference in their entireties. The International Application was published in Japanese on Jun. 4, 2015 as WO 2015/079744.

BACKGROUND ART

In recent years, as a battery anticipated to have a small size, a light weight and high capacity, a non-aqueous electrolytic solution-based secondary battery such as a lithium ion battery has been proposed and put into practical use.

The lithium ion battery is configured to have a cathode and an anode which have properties capable of reversibly intercalating and deintercalating lithium ions, and a non-aqueous electrolyte.

Regarding an anode material for the lithium ion battery, as an anode active material, a carbon-based material or a lithium-containing metal oxide having properties capable of reversibly intercalating and deintercalating lithium ions such as lithium titanate ($Li_4Ti_5O_{12}$) is generally used.

On the other hand, as a cathode material of the lithium ion battery, an electrode material mixture is used which includes, as a cathode active material, a lithium-containing metal oxide having properties capable of reversibly intercalating and deintercalating lithium ions such as lithium iron phosphate ($LiFePO_4$), a binder and the like. Then, the electrode material mixture is applied to the surface of a metal foil which is called a collector to form the cathode of the lithium ion battery.

Compared with conventional secondary batteries such as lead batteries, nickel-cadmium batteries and nickel-hydrogen batteries, the lithium ion batteries have a lighter weight, a smaller size and higher energy. Therefore, the lithium ion batteries are used not only as small-size power supplies in portable electronic devices such as mobile phones and notebook personal computers but also as large-size stationary emergency power supplies.

In addition, recently, studies have been performed regarding the use of lithium ion batteries as high-output power supplies for plug-in hybrid vehicles, hybrid vehicles and electric power tools, and such batteries used as the high-output power supplies are required to have high-speed charge and discharge characteristics.

However, electrode active materials, for example, electrode materials including a lithium phosphate compound having properties capable of reversibly intercalating and deintercalating lithium ions have a problem of low electron conductivity. Therefore, as an electrode material having increased electron conductivity, there have been proposed electrode materials in which the particle surfaces of an electrode active material are uniformly coated with a chemically accumulated carbonaceous film to improve the current density of the electrode active material (for example, refer to Patent Documents 1 to 5) and the like.

CONVENTIONAL ART DOCUMENTS

Patent Documents

Patent Document 1: Japanese Laid-open Patent Publication No. 2001-15111
Patent Document 2: Japanese Laid-open Patent Publication No. 2008-159446
Patent Document 3: Japanese Laid-open Patent Publication No. 2012-133888
Patent Document 4: Japanese Unexamined Patent Application Publication No. 2013-525975
Patent Document 5: Japanese Unexamined Patent Application Publication No. 2013-538933

DISCLOSURE OF THE INVENTION

Problem to be Solved by the Invention

Meanwhile, in order to use the electrode active material including a lithium phosphate compound as an electrode material of lithium ion batteries that are used as high-output power supplies, it is necessary to increase the electron conductivity.

However, while there are many cases in which a solution obtained by dissolving a polymer material or the like is used as a carbon source in order to uniformly coat the surfaces of the lithium phosphate compound particles with the carbon material, it is difficult for a carbonaceous film to be formed in gaps or the like generated between the particles due to the high viscosity of the solution. Therefore, in a case in which an electrode is produced using the obtained particles, the internal resistance increases, and the output characteristics deteriorate, which are not preferable.

In addition, there are cases in which the molecular weight of the carbon source is reduced to decrease the viscosity of the solution in order to generate the carbonaceous film even in gaps among particles. However, in this case, the carbon source is decomposed and evaporated in a carbonization step, and thus does not remain as a carbonaceous film. Therefore, when an electrode is produced using the obtained particles, the internal resistance increases, and the output characteristics deteriorate, which are not preferable.

It is thought that a large amount of a carbon source is added in order to increase the amount of carbon which can be remained even after a carbonization treatment. However, in such a case, it is difficult for carbon to be uniformly remained due to segregation thereof. Therefore, when an electrode is produced using the particles obtained as described above, the internal resistance increases, and the output characteristics deteriorate, which are not preferable. Furthermore, since an increase in the amount of remaining carbon leads to an increase in the amount of materials that do not contribute to charging and discharging on electrodes, the battery capacity deteriorates.

In addition, a carbonaceous film remaining after the carbonization treatment is present on the surface of a lithium phosphate compound without having any chemical bonds. Therefore, since electron transfer is lowered between a carbon layer and the lithium phosphate compound, in a case in which an electrode is produced using the obtained particles, the internal resistance increases, and the output characteristics deteriorate, which are not preferable.

Furthermore, regarding the carbonaceous film which coats the surfaces of the electrode active material particles described in Patent Documents 1 to 5, the coating state and coating ratio of the carbonaceous film have been measured by observing approximately 10 arbitrary positions using a transmission electron microscope (TEM) or a scanning electron microscope (SEM). However, there was a concern that the carbonaceous coating ratio may significantly vary depending on positions selected for the observation. Particularly, regarding aggregates formed by agglomerating electrode active material particles which have the carbonaceous film on the surfaces thereof, it has been difficult to measure the coating status inside the aggregates and the coating ratio of the carbonaceous film of the aggregates.

It has been difficult to confirm the improvement in the electron conductivity of the electrode active material only with a transmission electron microscope (TEM) or a scanning electron microscope (SEM), since the electron conductivity is affected by the bonding state between the surface of the electrode active material and the carbonaceous film, the thickness of the carbonaceous film, the state of the film such as unevenness, and the like.

The present invention has been made to solve the above-described problems, and an object of the present invention is to provide an electrode material which has a coat of a carbonaceous material that efficiently, uniformly, and strongly coats the surfaces of electrode active material particles, has improved electron conductivity and is capable of improving the charge and discharge capacity of batteries, and a method for manufacturing the same.

MEANS FOR SOLVING THE PROBLEMS

As a result of intensive studies to solve the above-described problems, the present inventors found that, in the composite particles which includes a carbonaceous substance and an electrode active material, wherein a carbonaceous film is provided on the surfaces of electrode active material particles, when the standard rate constant of the redox reaction of ferrocene occurring on the surfaces of the composite particles of the carbonaceous electrode active material is $1 \times 10^{-5}$ cm/s or more, it is possible to improve the electron conductivity of the electrode active material, and thus the high-speed charge and discharge characteristics of electrodes can be improved, and the present inventors completed the present invention.

(1) That is, an electrode material of the present invention is an electrode material including composite particles, which include a carbonaceous substance and electrode active material, wherein a carbonaceous coating is formed on surfaces of electrode active material particles, in which a standard rate constant of a redox reaction of ferrocene occurring on the surfaces of the composite particles is $1 \times 10^{-5}$ cm/s or more.

(2) A method of producing the electrode material of the present invention includes: preparing a slurry by mixing an electrode active material or a precursor of the electrode active material, an organic compound, and a surface modifier; generating a granulated body by spraying and drying the slurry; and firing the granulated body in a non-oxidative atmosphere at a temperature in range of 500° C. to 1000° C.

Effects of the Invention

According to the present invention, an electrode material is provided wherein a standard rate constant of the redox reaction of ferrocene, which occurs on the surfaces of the composite particles which includes a carbonaceous substance and an electrode active material, is $1 \times 10^{-5}$ cm/s or more, has the improved electron conductivity of the composite particles of the carbonaceous electrode active material which has a carbonaceous material on the surfaces of electrode active material particles, and is capable of improving the charge and discharge capacity of batteries, and also provide a method of forming the electrode material.

BEST MODE FOR CARRYING OUT THE INVENTION

Hereinafter, embodiments of the present invention are explained.

Electrode Material

The electrode material of the present embodiment is an electrode material including composite particles which includes a carbonaceous substance and an electrode active material wherein a carbonaceous material is provided on surfaces of electrode active material particles. A standard rate constant of a redox reaction of ferrocene which occurs on the surfaces of the composite particles is $1 \times 10^{-5}$ cm/s or more.

In addition, the electrode material preferably has a structure in which the surfaces of the electrode active material particles and the carbonaceous material are crosslinked by the electrode active material particles and substances other than the carbonaceous material.

The carbonaceous material refers to a carbon simple substance or a carbon material including carbon as a main component.

In addition, "having the carbonaceous material on the surfaces of the electrode active material particles" means any one or more states which include; a state in which the surfaces of the electrode active material particles are coated with a coat (carbonaceous film) made of a carbonaceous material; a state in which a plurality of particles made of a carbon simple substance or particles made of a carbon material including carbon as a main component are attached or bonded to the surfaces of the electrode active material; a state in which a plurality of aggregates formed by agglomerating a plurality of particles made of a carbon simple substance or particles made of a carbon material including carbon as a main component area attached or bonded to the surfaces of the electrode active material particles.

The above-described state also includes a state in which any one or two more of the particles made of a carbon simple substance, the particles made of a carbon material including carbon as a main component, and the aggregates formed by agglomerating a plurality of the above particles, are present between the composite particles which includes the carbonaceous material and the electrode active material.

The substance present between the surfaces of the electrode active material particles and the carbonaceous material includes elements such as silicon (Si), titanium (Ti), aluminum (Al) and phosphorous (P) which are derived from, for example, a silane coupling agent, a titanate coupling agent, an aluminate coupling agent, a phosphoric acid-based coupling agent, and the like. The substance contributes to the improvement in the adhesion between the surfaces of the electrode active material particles and carbonaceous particles by being present between the surfaces of the electrode active material particles and the carbonaceous material. In addition, the kind of the substances present between the surfaces of the electrode active material particles and the carbonaceous material may be one kind or two or more kinds.

"The standard rate constant of the redox reaction of ferrocene" refers to the reaction rate of the oxidation-reduction reaction of ferrocene/ferrocenium, which occurs per unit area of the surfaces of the composite particles, which includes the carbonaceous substance and the electrode active material, in a standard state. The redox reaction is an outer-sphere electron migration reaction in which the reaction rate is affected by the electron state on the electrode surface. The redox reaction rate is fast when surfaces have high electron conductivity, and the redox reaction rate is slow when surfaces have low electron conductivity. That is, when the redox reaction rate of ferrocene/ferrocenium is improved, it is possible to improve electron conductivity on the surfaces of the electrode active material particles, and furthermore, it is possible to improve the electron conductivity of the composite particles.

It is found that, when the standard rate constant of the redox reaction of ferrocene is $1 \times 10^{-5}$ cm/s or more, and more preferably $1 \times 10^{-4}$ cm/s or more, it is possible to determine that the electron conductivity of the composite particles which includes the carbonaceous substance and the electrode active material is improved, even if the bonding state between the surfaces of the electrode active material particles and the carbonaceous film, the thickness of the carbonaceous film, the state of the carbonaceous film such as unevenness and the like are not confirmed. That is, it is possible to know in advance that lithium ion batteries have excellent charge and discharge capacity is manufactured even if the battery characteristics thereof is not actually measured after assembling the lithium ion batteries.

As the components of the electrode active material particles, it is preferable to use, as a main component, one kind selected from the group consisting of lithium cobaltate, lithium nickelate, lithium manganate, lithium titanate, and $Li_xA_yD_zPO_4$ (here, A represents one or more selected from the group consisting of Co, Mn, Ni, Fe, Cu, and Cr, D represents one or more selected from the group consisting of Mg, Ca, S, Sr, Ba, Ti, Zn, B, Al, Ga, In, Si, Ge, Sc, Y, and rare earth elements, $0<x<2$, $0<y<1.5$ and $0 \le z<1.5$).

Here, A is preferably Co, Mn, Ni or Fe, and D is preferably Mg, Ca, Sr, Ba, Ti, Zn or Al in terms of a high discharge potential, an abundant resource amount, safety and the like.

Here, the rare earth elements refer to 15 elements of La, Ce, Pr, Nd, Pm, Sm, Eu, Gd, Tb, Dy, Ho, Er, Tm, Yb, and Lu which belong to the lanthanum series.

The coating ratio of the carbonaceous material regarding the surfaces of the electrode active material particles can be measured using a transmission electron microscope (TEM), an energy-dispersive X-ray spectroscope (EDX) or the like.

The coating ratio with respect to the surfaces of the electrode active material particles which is coated with the carbonaceous material is preferably 60% or more, and more preferably 80% or more, so that a reaction of the intercalation and deintercalation of lithium ions can be uniformly caused throughout all the surfaces of the electrode active material particles when the electrode material of the present invention is used as an electrode material for lithium ion batteries.

The reason for setting the coating ratio of the carbonaceous material regarding the surfaces of the electrode active material particles to 60% or more is that the electron conductivity of the electrode active material particles deteriorates when a coating ratio is less than 60%. Due to the deterioration, it takes a long period of time for lithium ions or electrons to migrate in the composite particles. As a result, the internal resistance of electrodes increases in which the composite particles are used as an electrode material, and the output characteristics of lithium ion batteries wherein the electrode is used deteriorate, which are not preferable.

The specific surface area of the composite particles which includes the carbonaceous substance and the electrode active material is preferably in a range of 1 $m^2$/g to 80 $m^2$/g, and more preferably in a range of 4 $m^2$/g to 50 $m^2$/g.

The reason for setting the specific surface area of the composite particles which includes the carbonaceous substance and the electrode active material in a range of 1 $m^2$/g to 80 $m^2$/g is that, when the specific surface area is less than 1 $m^2$/g, it takes a long period of time for lithium ions or electrons to migrate in the composite particles, and in a case in which electrodes are formed using the composite particles, the high-speed charge and discharge characteristics of the electrodes deteriorate, which is not preferable. On the other hand, when the specific surface area exceeds 80 $m^2$/g, an increase in the specific surface area of the composite particles leads to an increase in the necessary mass of carbon, and in a case in which electrodes are formed using the composite particles, the charge and discharge capacity of the batteries for which the electrode is used decreases, which is not preferable.

"The internal resistance" mentioned herein refers to the sum of, mainly, electron resistance and lithium ion migration resistance. The electron resistance is proportional to the amount, the density and crystallinity of carbon. The lithium ion migration resistance is inversely proportional to the amount, the density and crystallinity of carbon.

As a method for evaluating the internal resistance, for example, a current-rest method or the like is used. In the current-rest method, the internal resistance is measured as the sum of interconnection resistance, contact resistance, charge migration resistance, lithium ion migration resistance, lithium reaction resistance at the positive and anodes, interelectrode resistance determined by the distance between the positive and anodes, resistance regarding the solvation and desolvation of lithium ions, and the solid electrolyte interface (SEI) migration resistance of lithium ions.

The content rate of carbon in the composite particles which includes the carbonaceous substance and the electrode active material is preferably in a range of 0.3% by mass to 8.0% by mass, and more preferably in a range of 0.5% by mass to 5.0% by mass.

The reason for setting the content rate of carbon in the composite particles in a range of 0.3% by mass to 8.0% by mass is that, when the content rate is less than 0.3% by mass, in a case in which an electrode are formed using the composite particles, the discharge capacity of batteries in which the electrode is useddecreases at a high speed charge-discharge rate, and it becomes difficult to realize sufficient charge and discharge rate performance, which is not preferable. On the other hand, when the content rate exceeds 8.0% by mass, the migration distance of lithium ions in the composite particles increases, that is, the migration distance of lithium ions in the carbonaceous film wherein the diffusion rate of the lithium ions is slow becomes long when the lithium ions diffuse in the carbonaceous material. In a case in which electrodes are formed using the composite particles, the voltage drop at a high speed charge-discharge rate of batteries for which the electrode is used needs to be addressed, which is not preferable.

The film thickness of the carbonaceous film made of the carbonaceous material which is present on the surfaces of the electrode active material particles is preferably in a range of 0.1 nm to 10 nm, and more preferably in a range of 1 nm to 5 nm.

The reason for setting the film thickness of the carbonaceous film in a range of 0.1 nm to 10 nm is that, when the film thickness of the carbonaceous film is less than 0.1 nm, it is difficult to produce a uniform carbonaceous film, the surfaces of the electrode active material particles is not coated uniformly with the carbonaceous film, and the electron conductivity on the surfaces of the electrode active material particles is insufficient, and thus, particularly, in a case in which electrodes are formed using such composite particles which includes the carbonaceous substance and the electrode active material, the voltage significantly drops when batteries are charged and discharged at a high speed. On the other hand, when the film thickness of the carbonaceous film exceeds 10 nm, the migration distance in the carbonaceous film, in which lithium ions migrate at a low speed, becomes long, and thus, the voltage significantly drops when batteries are charged and discharged at a high speed, particularly, in a case in which electrodes are formed using the composite particles.

Particularly, electrode materials having $1 \times 10^{-5}$ cm/s or more of a standard rate constant of the redox reaction of ferrocene which occurs on the surfaces of the composite particles and a content of carbon in the composite particles in a range of 0.3% by mass to 8.0% by mass are preferred, since the electrode materials have a coat of a carbonaceous material that efficiently, uniformly, and strongly coats the surfaces of electrode active material particles, has improved electron conductivity, and is capable of improving the charge and discharge capacity of batteries.

Method for Producing the Electrode Material

A method for producing the electrode material of the present embodiment is a method including a step of drying a slurry, which includes an electrode active material or a precursor thereof, an organic compound and water, and has a ratio (D90/D10) which is in a range of 5 to 30, wherein (D90) means the particle diameter at which the accumulated volume percentage is 90% in the particle size distribution of the electrode active material or the precursor thereof and (D10) means the particle diameter at which the accumulated volume percentage is 10%, and then firing the obtained dried substance at a temperature in a range of 500° C. to 1000° C. in a non-oxidative atmosphere.

Similar to the above-described electrode material, the electrode active material preferably includes one as a main component which is selected from the group consisting of lithium cobaltate, lithium nickelate, lithium manganate, lithium titanate and $Li_xA_yD_zPO_4$ (here, A represents one or more selected from the group consisting of Co, Mn, Ni, Fe, Cu and Cr, D represents one or more selected from the group consisting of Mg, Ca, S, Sr, Ba, Ti, Zn, B, Al, Ga, In, Si, Ge, Sc, Y and rare earth elements, $0<x<2$, $0<y<1.5$, and $0 \leq z<1.5$).

Here, A is preferably Co, Mn, Ni or Fe, and D is preferably Mg, Ca, Sr, Ba, Ti, Zn or Al in terms of a high discharge potential, an abundant resource amount, safety and the like.

Here, the rare earth elements refer to 15 elements of La, Ce, Pr, Nd, Pm, Sm, Eu, Gd, Tb, Dy, Ho, Er, Tm, Yb, and Lu which belong to the lanthanum series.

As the compound represented by $Li_xA_yD_zPO_4$ ($Li_xA_yD_zBO_4$ powder), it is possible to use a compound produced using a conventional method such as a solid phase method, a liquid phase method or a gas phase method.

As the compound ($Li_xA_yD_zPO_4$ powder), a compound ($Li_xA_yD_zPO_4$ particles) can be preferably used, which is obtained by, for example, obtaining a slurry-form mixture which is obtained by mixing a Li source, which is selected from the group consisting of lithium salts such as lithium acetate ($LiCH_3COO$) and lithium chloride (LiCl) and lithium hydroxide (LiOH), a divalent iron salt such as iron (II) chloride ($FeCl_2$), iron (II) acetate ($Fe(CH_3COO)_2$) or iron (II) sulfate ($FeSO_4$), a phosphoric acid compound such as phosphoric acid ($H_3PO_4$), ammonium dihydrogen phosphate ($NH_4H_2PO_4$) or diammonium hydrogen phosphate (($NH_4)_2HPO_4$), and water, hydrothermally synthesizing the mixture using a pressure resistant airtight vessel, washing the obtained sediment using water so as to generate a cake-like precursor substance, and firing the cake-like precursor substance.

The $Li_xA_yD_zPO_4$ powder may be crystalline particles, amorphous particles or mixed crystal particles in which crystalline particles and amorphous particles coexist. The reason why $Li_xA_yD_zPO_4$ powder which is amorphous particles can be used is that when such amorphous particles are thermally treated in a non-oxidative atmosphere at a temperature in a range of 500° C. to 1000° C., the amorphous $Li_xA_yD_zPO_4$ powder crystallizes.

In a case in which the electrode active material particles are used as the electrode active material or the precursor thereof, the surfaces of the electrode active material particles are modified using a surface modifier in order to improve the coating efficiency of the surfaces of the electrode active material particles with the carbonaceous material.

The reason for modifying the surfaces of the electrode active material particles is that, when the surfaces of the electrode active material particles are modified to improve the affinity with a macromolecular material that is the carbonaceous material and a slurry which obtained by mixing the electrode active material particles, the organic compound, and water is sprayed and dried in the atmosphere in the subsequent step, it is possible to prevent the separation of the organic compound from the surfaces of the electrode active material particles, and the adhesion after sintering between the electrode active material particles and the carbonaceous material also improves.

The surface modifier is not particularly limited, and examples thereof include silane coupling agents, titanate coupling agents, aluminate coupling agents, phosphoric acid-based coupling agents, carboxylic acid-based coupling agents, amino acid, surfactants and the like. The surface modifier may be singly used, or a mixture of two or more thereof.

Among the surface modifiers, the use of substances which can crosslinks the surfaces of the electrode active material or the precursor thereof and the organic compound is preferred since the adhesiveness can be improved in a production step and after sintering. Examples of the above-described substances include silane coupling agents, titanate coupling agents, aluminate coupling agents, phosphoric acid-based coupling agents, carboxylic acid-based coupling agents, and the like. The substance which can crosslink the surfaces of the electrode active material or precursor thereof and the organic compound may be singly used, or a mixture of two or more substances may be used.

Among the above-described surface modifiers, particularly, silane coupling agents, titanate coupling agents, aluminate coupling agents and phosphoric acid-based coupling agents are preferred. The reason is that elements such as Si, Ti, Al, P and the like which present between the surfaces of the sintered electrode active material particles and the carbonaceous material can contribute to the improvement in the adhesion between the surfaces of the electrode active material particles and the carbonaceous material.

The amount of the surface modifier which is added to modify the surfaces of the electrode active material particles is preferably in a range of 0.5 mg to 5 mg with respect to 1 square meter of the surface area of the electrode active material particles.

The reason for setting the adding amount of the surface modifier in a range of 0.5 mg to 5 mg with respect to 1 square meter of the surface area of the electrode active material particles is that, when the addition amount is less than 0.5 mg, the surfaces of the electrode active material particles is not sufficiently modified, and on the other hand, when the addition amount exceeds 5 mg, the proportion of the surface modifier which remains behind after a firing step that is a post step increases, and therefore the charge and discharge capacity per unit mass of batteries decreases when the batteries includes electrode which are formed using the electrode active material particles.

There is no particular limitation regarding the size of the electrode active material particles, but the average particle diameter of primary particles is preferably in a range of 0.01 µm to 2 µm, and more preferably in a range of 0.02 µm to 0.5 µm.

The reason for limiting the average particle diameter of the primary particles of the electrode active material particles in the above-described range is described below. When the average particle diameter of the primary particles is less than 0.01 µm, it becomes difficult to sufficiently coat the surfaces of the primary particles with the carbonaceous material, and in a case in which electrodes are formed using the electrode active material particles, the discharge capacity of batteries in which the electrode is used decreases at a high speed charge-discharge rate. Therefore, it becomes difficult to realize sufficient charge and discharge rate performance, which are not preferable. On the other hand, when the average particle diameter of the primary particles exceeds 2 µm, the internal resistance of the primary particles increases. Therefore, in a case in which electrodes are formed using the electrode active material particles, the discharge capacity of batteries for which the electrode is used becomes insufficient at a high speed charge-discharge rate, which are not preferable.

The shape of the electrode active material particle is not particularly limited, but the shape of the electrode active material particle is preferably spherical, particularly, truly spherical. The reason is that it is easy to generate electrode materials which are spherical secondary particles, particularly, truly spherical secondary particles.

The reason why spherical is preferable as the shape of the electrode active material particle is that it is possible to reduce the amount of a solvent when paste for cathodes is prepared by mixing the electrode material, a binder resin (binding agent) and the solvent together, and it becomes possible to easily apply the paste for cathodes to a collector.

In addition, when the shape of the electrode active material particle is spherical, the surface area of the electrode active material particle is minimized, and it is possible to set the blending amount of a binder resin (binding agent) which is added to an electrode material mixture to the minimum amount, and to decrease the internal resistance of the obtained cathode, which are preferable.

Furthermore, since it is easy to closely pack the electrode active material particles, the amount of the cathode material loaded per unit volume increases. Accordingly, it is possible to increase the electrode density, and consequently, it is possible to increase the capacity of lithium ion batteries, which are preferable.

Examples of the organic compound include polyvinyl alcohol, polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols and the like.

Regarding the blending ratio between the electrode active material or the precursor thereof and the organic compound, when the total amount of the organic compound is converted to the amount of carbon, the content rate of carbon in the composite particles which includes the carbonaceous substance and the electrode active material is preferably in a range of 0.3% by mass to 8.0% by mass, and more preferably in a range of 0.5% by mass to 5.0% by mass.

The above-described electrode active material or precursor thereof and the organic compound are dissolved or dispersed in water, thereby preparing a homogeneous slurry. A dispersant is preferably added during the dissolution or dispersion.

The method of dissolving or dispersing the electrode active material or precursor thereof and the organic compound in water is not particularly limited as long as the electrode active material or precursor thereof can be dispersed, and the organic compound can be dissolved or dispersed. For example, it is preferable to use a medium stirring-type disperser that stirs medium particles at a high speed such as a planetary ball mill, a vibration ball mill, a bead mill, a paint shaker or an attritor.

The surface modifier is added to and stirred with the obtained slurry. In a case in which a surface modifier such as a silane coupling agent or the like is used that can react with the surface of a lithium phosphate compound due to heating, stirring is performed while the slurry is heated at a temperature of 100° C.

When the organic compound which is a carbon source is dissolved or dispersed, it is preferable that the electrode active material or the precursor thereof is dispersed in a primary particle form, and then the organic compound is added to the dispersion to dissolve the organic compound by stirring. Due to such a method, the surfaces of the primary particles of the electrode active material or the precursor thereof are coated with the organic compound, and consequently, carbon derived from the organic compound is uniformly interposed among the primary particles of the electrode active material or the precursor thereof.

In the preparation of the slurry, it is possible to set a volume density of the obtained aggregate in a range of 50% by volume to 80% by volume of the volume density of a solid body which has the same external appearance and is similar to the aggregate, when the dispersion conditions of the slurry such as, for example, the respective concentrations of the electrode active material or the precursor thereof and the organic compound in the slurry, the stirring time and the like are appropriately adjusted so that the ratio (D90/D10) of the electrode active material or the precursor thereof falls in a range of 5 to 30. Therefore, it is possible to increase the concentration of the gasified substance of an aromatic carbon compound inside the aggregate, and furthermore, it becomes possible to provide an almost even carbonaceous film on the surface of the electrode active material included in the aggregate.

Next, the slurry is sprayed and dried in a high-temperature atmosphere, for example, in the atmosphere at 70° C. to 250° C.

Next, the dried substance is fired in a non-oxidative atmosphere at a temperature in a range of 500° C. to 1000° C., preferably in a range of 600° C. to 900° C., for 0.1 hours to 40 hours. The non-oxidative atmosphere is preferably an inert atmosphere of nitrogen ($N_2$), argon (Ar) or the like.

The reason for setting the firing temperature in a range of 500° C. to 1000° C. is that, when the firing temperature is lower than 500° C., the organic compound included in the dried substance is not sufficiently decomposed and reacted, and thus the organic compound is not sufficiently carbonized. Consequently, a high-resistance decomposed substance of the organic compound is generated in the obtained aggregate, which is not preferable. On the other hand, when the firing temperature exceeds 1000° C., not only Li in the electrode active material evaporates and change the composition of the electrode active material, but the grain growth of the electrode active material is also accelerated. Consequently, the discharge capacity of batteries becomes low at a high speed charge-discharge rate, and it becomes difficult to realize sufficient charge and discharge rate performance, which is not preferable.

In the firing step, it is possible to control the particle size distribution of the obtained aggregate by appropriately adjusting the firing conditions of the dried substance, for example, the temperature-increase rate, the maximum holding temperature, the holding time, and the like.

Therefore, the composite particles obtained by coating the surfaces of the electrode active material particles with the carbonaceous material are obtained.

Due to the above-described steps, an aggregate (the composite particles which includes the carbonaceous substance and the electrode active material) are obtained as secondary particles wherein the surfaces of the primary particles of the electrode active material particles are coated with a carbonaceous material which is generated by the thermal decomposition of the organic compound included in the dried substance, and the secondary particles are particles wherein the carbonaceous material is interposed between the primary particles.

This aggregate is the electrode material according to the present embodiment.

Electrode

An electrode of the present embodiment is an electrode including the electrode material of the present embodiment.

In order to produce the electrode of the present embodiment, coating material for forming the electrode or paste for forming the electrode is prepared by mixing the electrode material, a binding agent which is a binder resin and a solvent together. At this time, a conductive auxiliary agent such as carbon black may be added as necessary.

As the binding agent, that is, the binder resin, for example, a polytetrafluoroethylene (PTFE) resin, a polyvinylidene fluoride (PVdF) resin, fluororubber or the like is preferably used.

The blending ratio of the electrode material and the binder resin is not particularly limited, and, for example, the amount of the binder resin blended is set in a range of 1 part by mass to 30 parts by mass, and preferably in a range of 3 parts by mass to 20 parts by mass, with respect to 100 parts by mass of the electrode material.

Examples of the solvent used in the coating material for forming the electrode or the paste for forming the electrode include water; alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetylacetone and cyclohexanone; amides such as dimethyl formamide, N,N-dimethyl acetoacetamide and N-methyl pyrrolidone; glycols such as ethylene glycol, diethylene glycol and propylene glycol; and the like. These solvents may be singly used, or a mixture of two or more solvents may be used.

Next, the coating material for forming the electrode or the paste for forming the electrode is applied to one surface of a metal foil, and then is dried, thereby obtaining a metal foil having a coated film made of a mixture of the electrode material and the binder resin formed on one surface.

Next, the coated film is bonded by being pressed and is dried, thereby producing a collector (electrode) having an electrode material layer on one surface of the metal foil.

Therefore, the electrode of the present embodiment having a reduced oxygen content rate can be produced.

Lithium Ion Battery

A lithium ion battery of the present embodiment includes a cathode made of the electrode of the present embodiment.

The lithium ion battery includes the electrode which is produced using the electrode material of the present embodiment, and therefore, the battery can suppress not only the generation of gas inside the battery during charging and discharging steps but alto the deterioration of battery components without reducing the charge and discharge capacity of the battery in which the electrode is used. Therefore, it is possible to provide electrodes which have excellent charge and discharge characteristics and excellent long-term reliability.

In the lithium ion battery of the present embodiment, there is no particular limitation regarding the anode, an electrolytic solution, a separator and the like. For example, as the anode, it is possible to use an anode material such as metallic Li, a carbon material, a Li alloy or $Li_4Ti_5O_{12}$. In addition, a solid electrolyte may be used instead of the electrolytic solution and the separator.

As explained above, according to the electrode material of the present embodiment, it is possible to provide an electrode material which has $1\times10^{-5}$ cm/s or more of a standard rate constant of the redox reaction of ferrocene wherein the reaction occurs on the surfaces of the composite particles having the carbonaceous substance and the electrode active material, has an improved electron conductivity of the composite particles which includes the carbonaceous material present on the surfaces of the electrode active material particles, and is capable of improving the charge and discharge capacity of batteries.

According to the method of producing the electrode material of the present embodiment, it is possible to produce an electrode material which includes an aggregate (the composite particles which includes the carbonaceous substance and the electrode active material) in which the surfaces of the primary particles of the electrode active material particles are coated with a carbonaceous material, and secondary particles includes the primary particles and the carbonaceous material provided between the primary particles. Therefore, when the surfaces of the electrode active material particles is modified using a surface modifier, it is possible to provide an electrode material which has a coating of a carbonaceous material which coats the surfaces of electrode active material particles efficiently, uniformly and strongly, and has excellent charge and discharge characteristics.

EXAMPLES

Hereinafter, the present invention will be specifically explained using Examples 1 to 4 and Comparative Examples 1 and 2, but the present invention is not limited to the examples.

Example 1

Production of an Electrode Material

After 4 mol of lithium acetate ($LiCH_3COO$), 2 mol of manganese (II) sulfate ($MnSO_4$) and 2 mol of phosphoric acid ($H_3PO_4$) were mixed with 2 L (liters) of water so that the total amount of the mixture reached 4 L, and a homogeneous slurry-form mixture was prepared.

Next, the mixture was provided in a pressure resistant airtight vessel having a capacity of 8 L, and hydrothermal synthesis was performed at 200° C. for 1 hour.

Subsequently, the obtained sediment was washed using water, thereby obtaining a cake-like precursor of an electrode active material.

Next, a dispersion treatment was carried out for 150 g of the precursor (in terms of solid content) using a twin fluid spray jet mill so that D50 of the particle size distribution of the precursor of the electrode active material in the slurry became 38 nm.

Subsequently, 3-aminopropyltrimethoxysilane was added dropwise to the obtained slurry as a surface modifier at a ratio of 1.5 mg per square meter of the surface area of the precursor of the electrode active material, and was stirred at 100° C. for 5 hours.

Next, an aqueous solution of polyvinyl alcohol obtained by dissolving 7.0 g of polyvinyl alcohol (PVA) as an organic compound in 100 g of water was mixed with 150 g of the obtained surface-modified slurry.

Subsequently, the slurry was sprayed and dried in the atmosphere of 180° C., the obtained dried substance was fired in a nitrogen atmosphere at 700° C. for 1 hour, and the obtained fired substance was secondarily fired in a hydrogen atmosphere at 700° C. for 1 hour, thereby obtaining an electrode material of Example 1.

Evaluation of the Electrode Material

Evaluations were performed for the electrode material to determine the amount of carbon in the composite particles, which includes the carbonaceous material and the electrode active material, included in the electrode material, the film thickness of the carbonaceous film which is made of the carbonaceous material and is formed on the surfaces of the composite particles, and the coating ratio of the carbonaceous material with respect to the surfaces of the composite particles. The evaluation methods are as described below.

(1) Amount of Carbon

The amount of carbon included in the composite particles which includes the carbonaceous substance and the electrode active material was measured using a carbon and sulfur measuring instrument.

(2) Film Thickness of the Carbonaceous Film

The film thickness of the carbonaceous film made of the carbonaceous material on the surfaces of the composite particles which include the carbonaceous substance and the electrode active material was measured using a transmission electron microscope (TEM).

(3) Coating Ratio of the Carbonaceous Material

The coating ratio of the carbonaceous material with respect to the surfaces of the composite particles was measured using a transmission electron microscope (TEM).

The evaluation results are shown in Table 1.

Production of a Lithium Ion Battery

The aforementioned electrode material, polyvinylidene fluoride (PVdF) as a binder and acetylene black (AB) as a conductive auxiliary agent were mixed together so that the mass ratio thereof was set to 90:5:5, and furthermore, N-methyl-2-pyrrolidone (NMP) was added as a solvent to the mixture so as to impart fluidity, thereby producing a slurry.

Next, the slurry was applied on a 15 µm-thick aluminum (Al) foil, and was dried. After that, the aluminum foil was pressurized at a pressure of 600 kgf/cm², and a cathode for a lithium ion battery of Example 1 was produced.

A lithium metal was disposed as an anode so as to face the cathode for the lithium ion battery, and a separator made of porous polypropylene was disposed between the cathode and the anode, thereby producing a battery member.

Meanwhile, ethylene carbonate and diethyl carbonate were mixed together at (a mass ratio of) 1:1, and furthermore, 1 M of a $LiPF_6$ solution was added to the mixture, thereby producing an electrolyte solution having lithium ion conductivity.

Next, the aforementioned battery member was immersed in the electrolyte solution, thereby producing the lithium ion battery of Example 1.

Evaluation of the Lithium Ion Battery

The charge and discharge capacity of the lithium ion battery during charging and discharging was evaluated. The evaluation method is as described below.

A cathode having an electrode area of 20 cm² and an electrode density of 2.0 g/mL and an anode made of lithium metal were placed opposite to each other through a 25 µm-thick separator made of polypropylene, and were disposed in a coin cell vessel having a diameter of 2 cm and a thickness of 3.2 mm, and then the charge and discharge capacities were measured at 0.1 C and 3 C.

The evaluation results are described in Table 1.

Evaluation of the Standard Rate Constant

In order to evaluate the standard rate constant, a thin film of a lithium phosphate compound was produced, the surface of the thin film was modified, and the standard rate coefficient of the redox reaction of ferrocene/ferrocenium was evaluated.

Production of the Thin Film of a Lithium Phosphate Compound 1 mol of lithium acetate, 1 mol of ammonium dihydrogen phosphate and 1 mol of manganese acetate were dissolved in an aqueous solution of 6 mol/L of citric acid. 1 g of a methanol solution including 20% by mass of polyvinyl pyrrolidone was added dropwise to 3 g of the aqueous solution, and was stirred. The mixture was added dropwise onto a platinum plate having a polished surface, a film of the added mixture was generated using a spin coater, and the film was heated at 500° C. in the atmosphere, thereby obtaining a lithium manganese phosphate thin film.

A solution including 0.001% by mass of 3-aminopropyltrimethoxysilane was added dropwise onto the surface of the lithium manganese phosphate thin film at a ratio of 2 mg per square meter of the lithium manganese phosphate thin film, subsequently, was heated at 80° C. for 5 hours, and the surface of the precursor of the electrode active material was modified. After that, an aqueous solution of 20% by mass of polyvinyl alcohol as a carbon source was applied to the surface of the lithium manganese phosphate thin film using a spin coater, and then, was fired in a nitrogen atmosphere at 700° C. for 1 hour, thereby forming a thin film electrode on the platinum plate.

Measurement of Standard Rate Constant

Ethylene carbonate and diethyl carbonate were mixed together at (a mass ratio of) 1:1, and ferrocene was dissolved in the mixture, thereby preparing a solution of 100 mmol/L of ferrocene. This solution was used as an electrolytic solution, the above-described thin film electrode plate was used as a working electrode, and a lithium metal was used as a counter electrode and a reference electrode, thereby producing a three-electrode cell. The power collection for the thin film electrode that was the working electrode was performed by direct contact between collection terminals and the carbonaceous film. Cyclic voltammetry measurement was carried out for the three-electrode cell in a range of 3.7V vs Li+/Li and 2.9 V vs Li+/Li at a scanning rate of 0.01 V/s, thereby obtaining a cyclic voltammogram. The standard rate constant was computed from the peak potential of the oxidation current and the peak potential of the reduction current in the cyclic voltammogram.

The evaluation results are described in Table 1.

Example 2

An electrode material and a lithium ion battery of Example 2 were produced in the same manner as in Example 1 except that, as the surface modifier, 2 mg of 3-aminopropyltrimethoxysilane was added with respect to 1 square meter of the surface area of the precursor of the electrode active material.

For the obtained electrode material and the obtained lithium ion battery, evaluations were carried out in the same manner as in Example 1. The evaluation results are shown in Table 1.

Example 3

An electrode material and a lithium ion battery of Example 3 were produced in the same manner as in Example 1 except that, as the surface modifier, 1 mg of 3-aminopropyltrimethoxysilane was added with respect to 1 square meter of the surface area of the precursor of the electrode active material.

For the obtained electrode material and the obtained lithium ion battery, evaluations were carried out in the same manner as in Example 1. The evaluation results are shown in Table 1.

Example 4

An electrode material and a lithium ion battery of Example 4 were produced in the same manner as in Example 1 except that, as the surface modifier, 1.5 mg of vinyl trimethoxysilane was added with respect to 1 square meter of the surface area of the precursor of the electrode active material.

For the obtained electrode material and the obtained lithium ion battery, evaluations were carried out in the same manner as in Example 1. The evaluation results are described in Table 1.

Comparative Example 1

An electrode material and a lithium ion battery of Comparative Example 1 were produced in the same manner as in Example 1 except that the surface of the precursor of the electrode active material was not modified.

For the obtained electrode material and the obtained lithium ion battery, evaluations were carried out in the same manner as in Example 1. The evaluation results are described in Table 1.

Comparative Example 2

An electrode material and a lithium ion battery of Comparative Example 2 were produced in the same manner as in Example 1 except that the firing temperature of the slurry was set to 400° C.

For the obtained electrode material and the obtained lithium ion battery, evaluations were carried out in the same manner as in Example 1. The evaluation results are described in Table 1.

TABLE 1

|  | Amount of carbon (% by mass) | Film thickness of carbonaceous film (nm) | Coating ratio of carbonaceous material (%) | Standard rate constant (cm/s) | Charge and discharge capacity (mAh/g) | |
| --- | --- | --- | --- | --- | --- | --- |
|  |  |  |  |  | 0.1 C | 3 C |
| Example 1 | 4 | 2.1 | 92 | $2.00 \times 10^{-4}$ | 160 | 155 |
| Example 2 | 5 | 2.5 | 80 | $2.40 \times 10^{-4}$ | 160 | 154 |
| Example 3 | 3 | 2.0 | 94 | $1.0 \times 10^{-4}$ | 160 | 155 |
| Example 4 | 4 | 2.0 | 85 | $1.90 \times 10^{-4}$ | 158 | 153 |
| Comparative Example 1 | 0.2 | 1.1 | 58 | $3.00 \times 10^{-6}$ | 150 | 106 |
| Comparative Example 2 | 9 | 11 | 81 | $6.00 \times 10^{-8}$ | 100 | 60 |

From the results shown in Table 1, it was confirmed that, in the electrode materials of Examples 1 to 4, when the surface of the precursor of the electrode active material is modified, the standard rate constant of the redox reaction of ferrocene/ferrocenium was $1 \times 10^{-5}$ cm/s or more, the coating ratio of the carbonaceous material with respect to the surfaces of the electrode active material particles was 60% or more, the amount of carbon in the composite particles which includes the carbonaceous substance and the electrode active material was in a range of 0.3% by mass to 8.0% by mass, and the charge and discharge capacity of lithium ion batteries was 158 mAh/g or more when a charge and discharge rate was 0.1 C and was 135 mAh/g or more when a charge and discharge rate was 3 C. These results showed that the charge and discharge capacity was improved.

On the other hand, in the electrode materials of Comparative Examples 1 and 2, it was confirmed that at least any one of the standard rate constant of the redox reaction of ferrocene/ferrocenium, the coating ratio of the carbonaceous material with respect to the surfaces of the electrode active material particles and the amount of carbon in the composite particles which includes the carbonaceous substance and the electrode active material was inferior to those of the electrode materials of Examples 1 to 4, and the charge and discharge capacities of lithium ion batteries was inferior to those of the lithium ion batteries of Examples 1 to 4.

INDUSTRIAL APPLICABILITY

In the electrode material of the present invention, when the standard rate constant of the redox reaction of ferrocene occurring on the surface of the electrode active material is set to $1\times10^{-5}$ cm/s or more with respect to the composite particles, which includes the carbonaceous substance and the electrode active material, wherein the composite particles have a carbonaceous film on the surfaces of the electrode active material that is a main component of the composite particles, it is possible to improve the electron conductivity of the electrode active material, and therefore it is possible to provide an electrode material having excellent charge and discharge characteristics. Therefore, the electrode material of the present invention can also be applied to next-generation secondary batteries anticipated to have smaller size, lighter weight and higher capacity, and such effects are extremely great for the next-generation secondary batteries.

The invention claimed is:

1. An electrode material for lithium ion battery comprising:
    composite particles, which comprises a carbonaceous material which is generated by thermal decomposition of an organic compound, and an electrode active material which is made of a lithium phosphoric acid compound, wherein
    the carbonaceous material forms a carbonaceous film and surfaces of electrode active material particles are coated with the carbonaceous film,
    the coating ratio of the carbonaceous material with respect to the surfaces of the electrode active material particles is 60% or more,
    a film thickness of the carbonaceous film is in a range of 0.1 nm to 10 nm, and
    a standard rate constant of a redox reaction of ferrocene occurring on the surfaces of the composite particles is $1\times10^{-5}$ cm/s or more.

2. The electrode material for lithium ion battery according to claim 1,
    wherein a content of carbon in the composite particles is in a range of 0.3% by mass to 8.0% by mass.

3. The electrode material for lithium ion battery according to claim 1,
    wherein the composite particles are aggregates of a plurality of particles which are the electrode active material particles wherein the surface thereof is coated with the carbonaceous material.

4. The electrode material for lithium ion battery according to claim 1,
    wherein the electrode active material particles include as a main component $Li_xA_yD_zPO_4$, wherein A represents one or more selected from the group consisting of Co, Mn, Ni, Fe, Cu, and Cr, D represents one or more selected from the group consisting of Mg, Ca, S, Sr, Ba, Ti, Zn, B, Al, Ga, In, Si, Ge, Sc, Y and rare earth elements, $0<x<2$, $0<y<1.5$ and $0\leq z<1.5$.

5. The electrode material for lithium ion battery according to claim 4, wherein, in $Li_xA_yD_zPO_4$, A is Mn and z is 0.

6. A method of producing the electrode material for lithium ion battery according to claim 1, comprising:
    preparing a slurry by mixing an electrode active material made of a lithium phosphoric acid compound or a precursor of the electrode active material, an organic compound and a surface modifier so that the slurry has a ratio D90/D10 which is in a range of 5 to 30, wherein D90 means the particle diameter at which the accumulated volume percentage is 90% in the particle size distribution of the electrode active material or the precursor thereof and D10 means the particle diameter at which the accumulated volume percentage is 10%, and wherein the surface modifier is at least one selected from the group consisting of silane coupling agents, titanate coupling agents, aluminate coupling agents, phosphoric acid-based coupling agents, carboxylic acid-based coupling agents, amino acid and surfactants;
    generating a granulated body by spraying and drying the slurry;
    firing the granulated body in a non-oxidative atmosphere at a temperature in range of 500° C. to 1000° C. to generate composite particles that comprise an electrode active material and a carbonaceous film formed on the electrode active material;
    evaluating a standard rate constant of a redox reaction of ferrocene occurring on surfaces of the composite particles; and
    confirming whether or not the standard rate constant of the composite particles is $1\times10^{-5}$ cm/s or more to obtain the electrode material for lithium ion battery.

7. The method for producing an electrode material according for lithium ion battery to claim 6,
    wherein the granulated body has a structure in which electrode active material particles and a carbonaceous material are crosslinked by the surface modifier.

8. The method of producing the electrode material according to claim 6, further comprising:
    evaluating the coating ratio of the carbonaceous film with respect to the surfaces of the electrode active material particles of the composite particles and confirming whether or not the coating ratio of the carbonaceous film is 60% or more; and
    evaluating a film thickness of the carbonaceous film of the composite particles and confirming whether or not the carbonaceous film is in a range of 0.1 nm to 10 nm.

9. The method of producing the electrode material according to claim 6, wherein the step of preparing a slurry comprises the sub steps of:
    mixing an electrode active material made of a lithium phosphoric acid compound or a precursor of the electrode active material and a surface modifier to generate a mixture thereof; and
    mixing said mixture and an organic compound to generate the slurry.

10. The electrode material for lithium ion battery according to claim 1, wherein the composite particles are secondary particles.

11. The electrode material for lithium ion battery according to claim 1, wherein the composite particles are secondary particles in which carbonaceous material is interposed between the primary particles, and the surfaces of primary particles of the electrode active material are coated with carbonaceous material, and the carbonaceous material which coats the surfaces of primary particles of the electrode active material and the carbonaceous material which bonds the primary particles are made of the same material.

* * * * *